April 24, 1945.  J. C. BREUKER, JR  2,374,171
EYEGLASSES
Filed Nov. 10, 1942  2 Sheets-Sheet 1

Inventor
JOHN C. BREUKER, JR.

By Joseph A. O'Connell, and
Fred S. Lockwood  Attorneys

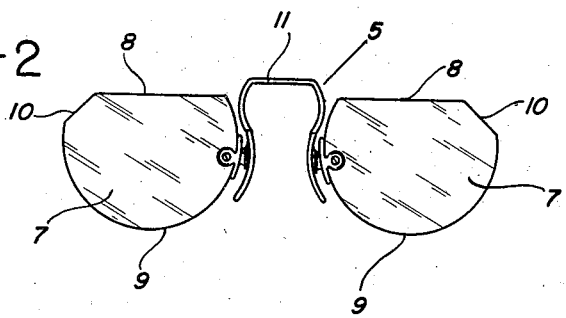
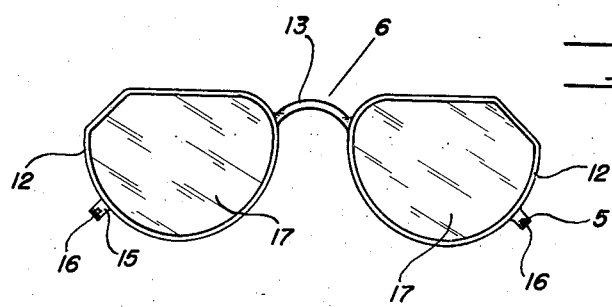
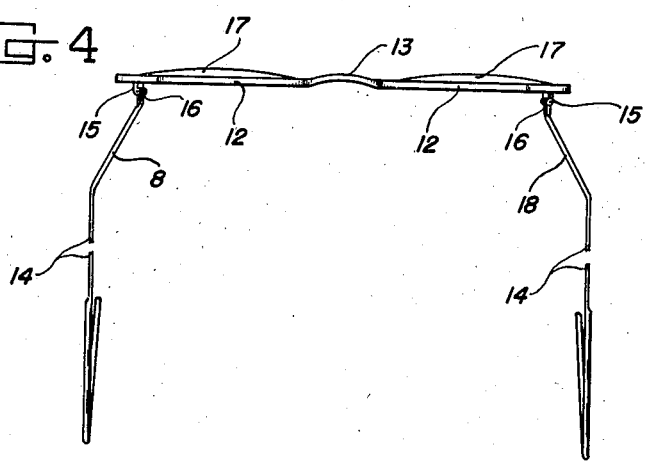

Patented Apr. 24, 1945

2,374,171

UNITED STATES PATENT OFFICE 2,374,171

EYEGLASSES

John Carl Breuker, Jr., United States Army, Phoenixville, Pa.

Application November 10, 1942, Serial No. 465,126

4 Claims. (Cl. 88—41)

(Granted under the act of March 3, 1883, as amended April 30, 1928; 370 O. G. 757)

The invention described herein may be manufactured and used by or for the Government for governmental purposes, without the payment to me of any royalty thereon.

The object of the present invention is to provide in a commercially practical form, eyeglasses, either in the form of "nose or rimless glasses" or in the form of "spectacles," suitable for wear on all occasions, and particularly under a gas mask.

Individuals who require refractive correction are rendered practically helpless by loss of effective vision resulting when corrective eyeglasses are removed in order to permit wearing of a gas mask. Hence the need of corrective eyeglasses for convenient and efficient wear under protective masks, both in industry and war, has been apparent from the time dating back approximately to the use of such masks.

In addition to the loss of effective vision, resulting from the removal of eyeglasses in order that the mask may be worn with maximum protection, the removal of the glasses preparatory to adjusting the mask to the face of the wearer is time-consuming and often requires exposing the individual to the effects of noxious gases with resulting injurious effect. Hence various attempts have been made to overcome the difficulties encountered by bespectacled individuals incidental to the use of gas masks. Numbered among the proposals for solving the problems encountered are: (1) an alteration in the construction and/or configuration of the gas mask to meet the particular requirements of the bespectacled individual being fitted; (2) an adjustment in one way or another of corrective lenses to the eyepieces of the mas mask; (3) substitution or replacement of the eyepieces of the gas mask with corrective or prescription lenses; and (4) an alteration in the construction and/or configuration of the corrective eyeglasses.

All of the above listed proposals have, for various reasons, failed to adequately overcome the difficulties encountered. Distortion of vision, lack of comfort, and detraction from the sealing contact of the gas mask with the face of the wearer are some of the major drawbacks militating against prior efforts to effectively solve the problem, with the solution of which this invention is particularly concerned.

The present invention is in that field of effort directed to the adaptation of corrective eyeglasses to use and wear under gas masks, and in this connection it may be observed that of the many and sundry efforts made to afford proper vision to the wearer when a gas mask is being worn, the one appearing most beneficial and practical is that tending to make efficient the use of corrective eyeglasses under the facepiece of the mask. Accordingly, it is the object, intent, and purpose of this invention to provide corrective spectacles which can be worn with equal advantage at all times and which when worn under the gas mask will continue to function as intended, and will in no wise detract from the ability of the gas mask to afford maximum protection to the wearer against irritant and noxious gases encountered in chemical warfare, and, at times, in industry.

The invention, together with its objects and advantages, will be best understood from a study of the following description taken in connection with the accompanying drawings wherein:

Figure 2 is an elevational view of "nose or rimless" eyeglasses embodying features of the invention.

Figure 3 is a view similar to Figure 2 and illustrating the application of the invention to that type of eyeglasses known as "spectacles."

Figure 4 is a plan view of the spectacles of Figure 3.

Figure 1:
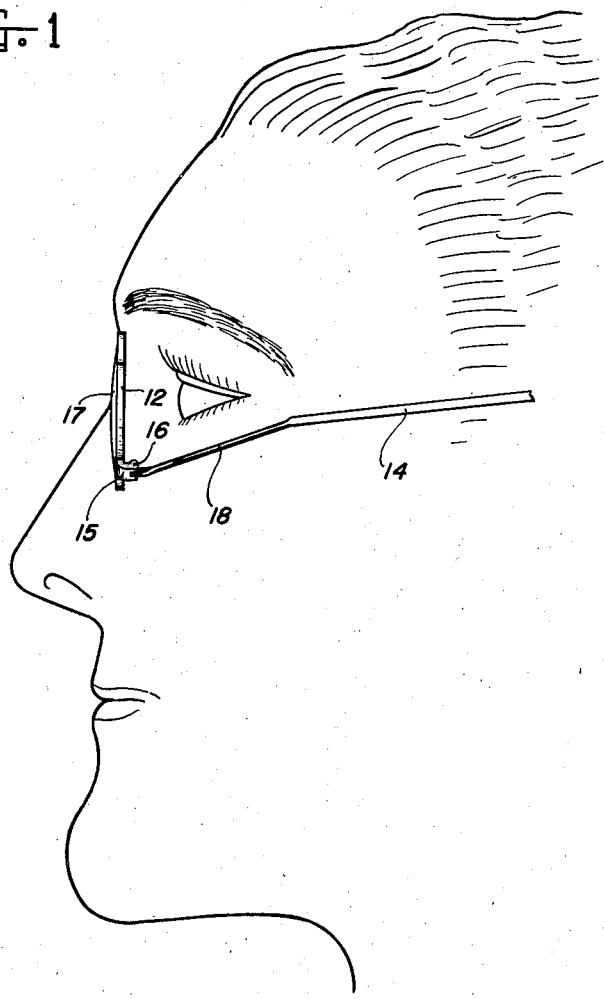
Figure 1 is a view illustrating a pair of eyeglasses according to this invention "in situ" on the head of a wearer.

As noted in the statement of the invention, the latter may be applied with equal facility to, either "nose or rimless" eyeglasses, such as shown in Figure 2 and indicated generally by the reference numeral 5; or to "spectacles," as shown in Figure 3 and indicated generally by the reference numeral 6.

A salient feature of the present invention is the shaping of the corrective lenses 7—7 in Figure 2 and 17—17 in Figure 3, in a manner to materially reduce the size or over-all area of the glasses without destroying or adversely affecting or changing the optical axes of the lenses so that the corrective or prescriptive character of the lenses used will be as required by the particular individual.

In accordance with the present invention the lens 7, 17, as the case may be, is cut down to give clearance under the gas mask, and for maximum results, the lens in accordance with this invention has a straight upper edge 8 that at the temple portion of the periphery of the lens is connected to the lower arcuate edge 9 by a relatively short, straight, biased edge 10, as shown.

It has been found in actual practice that a lens having an edge contour as contemplated by this invention, and as just described, can be ground without altering the prescription area of the lens. This is due to the fact that the optical centers of the lenses are ground in relation to the interpupillary distance rather than in relation to the center of the lens. Hence with the lens so ground there is no change in the optical center of the lens and the resulting correction to the vision as afforded by the lens is in accordance with that prescribed by the oculist. Hence, lenses ground and having edge contours as herein illustrated and described, can be used without any perceptible loss or contraction of the field of vision of the wearer. In other words, since only in the optical center of the lens is the prescription fully available, a reduction in the size or over-all area of the lens, as contemplated by this invention does not affect or change the optical axis of the lens.

As previously pointed out and as shown in Figure 2, the lenses contemplated by the present invention may be readily used in conjunction with the usual nosepiece or bridge 11, in providing, in a commercially practical form the nose or rimless glasses shown in said Figure 2.

With advantage the lenses may be employed in spectacles 6, that, as distinguished from nose or rimless glasses, and as shown in Figure 3, embody frames 12 for the lenses 17, a nosepiece or bridge 13 connecting the lens frames 12 at the nasal sides of the latter, and temples 14 hinged to the lens frames 12.

As shown in Figure 3, the lens frames 12 complement the edge contours of the lenses 17 and do not materally add to the over-all size of the eyeglasses.

Another feature of this invention is the location of the hinge connections between the lens frames 12 and the temples 14 of the spectacles. Prior art spectacles usually have the temple arms to which the temples are pivotally connected, projecting radially outward with respect to the lens frames in substantially horizontal planes, presenting projections difficult to avoid incidental to donning or removing the facepiece of a modern gas mask. As a consequence, such location of the hinge joints in prior art spectacles offers serious obstacles to the rapid application and removal of the gas mask.

To overcome the objections above noted with regard to the location of the hinge connections between the lens frames and the temples, the temple arms, herein indicated by the reference numeral 15—15, in accordance with this invention, extend radially from the temple sides of the frames 12, downwardly and outwardly, and substantially at an acute angle to the horizontal, being located lower down on the frames 12 than is conventional. By analogy, the temple arms 15—15 may be said to be located on the frames 12—12 at 5 o'clock and 7 o'clock respectively, the positions of these temple arms corresponding substantially to the location of the numerals 5 and 7 on the facepiece of a clock.

By so locating the temple arms 15, the same do not objectionably project beyond the peripheries of the frames 12 as to offer undesirable projections with which the gas mask may become engaged, causing a displacement of the spectacles, and consequent delay in the donning of the gas mask, or other disadvantage to the person requiring the use of the spectacles under the gas mask.

The temples 14 are hinged at one end thereof to the temple arms 15 in the usual manner and as indicated generally at 16.

The temples 14 extend rearwardly from the frames 12 in the usual manner, and at the hinged ends thereof are offset downwardly and inwardly as at 18—18. The portions 18 of the temples are thus disposed below the eyes in close proximity to the cheekbones under the eyes of the wearer as shown in Figure 1. Hence the portions 18 of the temples offer little or no obstacle to the wearer when looking out of the corners of the eyes either to the right or to the left.

The rearwardly extending portions of the temples 14, by reason of the offsets 18, are also fitted closely to the sides of the head and tend to indent the skin of the wearer in a manner not to seriously interfere with the effective sealing contact of the peripheral edge of the facepiece with the skin of the wearer, and as will be appreciated by those familiar with the art of gas masks and the manner of fitting the same to the wearer.

It will be seen from the foregoing that in accordance with this invention the glasses or spectacles are readily fitted to the individual in the usual manner; permit the use of prescription lenses; and may be worn to advantage at all times in the usual manner, and, when occasion requires, with like advantage under a gas mask. In the latter instances the lenses of the eyeglasses will be found to so clear the facepiece of the mask that the position of the eyeglasses will not be affected in any manner as might result in harmful prismatic effects.

It will also be appreciated from the foregoing that corrective glasses embodying the features of the present invention may be worn under a gas mask without discomfort, without offering any serious impediment to a quick donning of the gas mask, and without in any way detracting from the value of the gas mask as a safety medium and protection against noxious gases encountered either in chemical warfare or in industry.

Having thus described the invention, what is claimed as new is:

1. Eyeglasses adapted for wear under a gas mask facepiece, said eyeglasses comprising lenses constructed with a departure from the conventional by being materially reduced in over-all area with arcuate lower edges, short straight biased temple edges, and straight upper edges; a frame complementing the lenses at their edge contours without materially adding to the size of the eyeglasses; and temples having downwardly and inwardly offset end portions hingedly connected to the frame by temple arms spaced downwardly on arcuate lower edges of the frame a material distance below normal locali of hinge joints, said temple arms being located and constructed so that they do not objectionably project outwardly beyond the peripheries of the frame.

2. Spectacles adapted for wear under a gas mask facepiece, said spectacles comprising a frame embodying a pair of lens-carrying portions, temple arms rigidly mounted on each of said lens-carrying portions materially below horizontal centers of said portions and disposed at a radial angle to the horizontal without projecting objectionably beyond peripheries of the frame, and temples pivoted at one end to each of said temple arms, the temples being downwardly and inwardly offset at their pivoted ends so that the temples fit closely to the sides of a wearer's head and tend to indent the skin of the wearer while the offset ends are disposed close to cheekbones below the wearer's eyes.

3. Spectacles adapted for wear with a gas mask, said spectacles being characterized by a pair of lens-carrying frame portions each having an arcuate lower edge extending from a straight upper edge at its nasal side to a point spaced downwardly from said upper edge at its temple side, said straight upper edge extending from the nasal side and terminating short of the temple side, a short straight biased temple edge portion connecting said lower and upper edges at the temple side, a temple arm rigidly mounted on the arcuate lower edge at approximately 7 o'clock and 5 o'clock positions for left and right hand portions respectively from a wearer's view to form hinge joints closely adjacent to said lower edges, and a temple having a downwardly and inwardly offset end portion hingedly pivoted to the hinge joint of each temple arm so that the temples fit closely to the sides of a wearer's face with their offset portions disposed close to cheekbones below the wearer's eyes.

4. Eyeglassses adapted for wear over the facepiece of the gas mask, said eyeglasses being constructed with a departure from the conventional by having prescription lenses of an over-all area considerably less than normal and with their optical centers ground in relation to an interpupillary distance rather than in relation to the centers of the lenses, and being further characterized by a frame structure which complements the edge contours of the lenses without materially adding to the over-all size of the eyeglasses, each lens-carrying portion of the frame having an edge contour presenting an arcuate lower edge extending from an upper edge of the lens frame at the nasal side thereof to a point spaced downwardly from said upper edge at the temple side thereof, said upper edge extending in a horizontal straight line from the nasal side and terminating short of the temple side of the frame, a short straight biased edge connecting the lower arcuate edge with said upper edge; and being further characterized by having closely adjacent temple arm hinge joints on the lower arcuate edges of the frame a material distance downwardly from the horizontal center of the frame with temples having downwardly and inwardly offset end portions pivoted at the hinge joints closely adjacent said lower arcuate edges so that the temple arms do not project objectionably beyond peripheries of the frame and the temples fit closely to the sides of a wearer's head, the offset portions being disposed close to the wearer's cheekbones below his eyes.

JOHN CARL BREUKER, Jr.